(12) United States Patent
Baumgartner et al.

(10) Patent No.: US 8,474,107 B2
(45) Date of Patent: Jul. 2, 2013

(54) ATTACHMENT ARRANGEMENT AND A TOOL FOR LOCKING AN ATTACHMENT ARRANGEMENT

(75) Inventors: Peter Baumgartner, Günzburg (DE); Bernd Schumacher, Illerkirchberg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 12/585,708

(22) Filed: Sep. 22, 2009

(65) Prior Publication Data

US 2010/0043185 A1 Feb. 25, 2010

Related U.S. Application Data

(63) Continuation of application No. PCT/EP2008/053355, filed on Mar. 20, 2008.

(30) Foreign Application Priority Data

Mar. 23, 2007 (DE) .................... 20 2007 004 549 U

(51) Int. Cl.
*F16B 5/06* (2006.01)
*F16B 2/24* (2006.01)

(52) U.S. Cl.
USPC ............................. 24/295; 24/293; 280/728.2

(58) Field of Classification Search
USPC ............ 24/291–291, 458, 453; 411/507–510; 296/1.08, 146.7, 191
See application file for complete search history.

(56) References Cited

U.S. PATENT DOCUMENTS

| | | | |
|---|---|---|---|
| 3,864,789 A | 2/1975 | Leitner | |
| 5,403,034 A | 4/1995 | Gans et al. | |
| 5,539,962 A * | 7/1996 | Lee | 24/453 |
| 5,601,260 A | 2/1997 | Shinohara et al. | |
| 5,887,319 A | 3/1999 | Smith | |
| 6,074,150 A * | 6/2000 | Shinozaki et al. | 411/508 |
| 6,141,837 A * | 11/2000 | Wisniewski | 24/295 |

(Continued)

FOREIGN PATENT DOCUMENTS

| | | |
|---|---|---|
| DE | 202 09 137 U1 | 12/2002 |
| DE | 103 57 448 A1 | 7/2004 |

(Continued)

OTHER PUBLICATIONS

Office Action in RU Appln No. 2009138292/11 dated Dec. 20, 2011.

(Continued)

*Primary Examiner* — Robert J Sandy
*Assistant Examiner* — Rowland D Do
(74) *Attorney, Agent, or Firm* — Foley & Lardner LLP

(57) ABSTRACT

An attachment arrangement is provided. The attachment arrangement includes a mounting structure having an opening, an attachment element to be inserted into the opening for attaching a part to the mounting structure, and a locking element of the attachment element for locking the attachment element to the mounting structure. The locking element is inserted as a part of the attachment element along an insertion direction into the opening in the mounting structure up to an end position and engages behind the opening in the end position such that it prevents removal of the attachment element from the opening and thus locks the attachment element to the mounting structure. The locking element has at least a first section and a second section that rest against the edge of the opening in succession when the attachment element is inserted through the opening.

18 Claims, 5 Drawing Sheets

U.S. PATENT DOCUMENTS

| | | | |
|---|---|---|---|
| 6,353,981 B1 | 3/2002 | Smith | |
| 6,665,914 B2 * | 12/2003 | Ogawa | 24/297 |
| 6,718,599 B2 * | 4/2004 | Dickinson et al. | 24/295 |
| 6,868,588 B2 * | 3/2005 | Dickinson et al. | 24/295 |
| 7,086,125 B2 * | 8/2006 | Slobodecki et al. | 24/295 |
| 7,156,413 B2 | 1/2007 | Fischer et al. | |
| 7,267,361 B2 | 9/2007 | Hofmann et al. | |
| 7,637,527 B2 * | 12/2009 | Mazanek et al. | 280/728.2 |
| 7,900,953 B2 * | 3/2011 | Slobodecki et al. | 280/728.2 |
| 2001/0032377 A1 * | 10/2001 | Lubera et al. | 24/293 |
| 2002/0007537 A1 * | 1/2002 | Lubera et al. | 24/293 |
| 2007/0158931 A1 | 7/2007 | Baumgartner et al. | |
| 2007/0216139 A1 * | 9/2007 | Mazanek et al. | 280/728.2 |
| 2008/0028577 A1 * | 2/2008 | Soman et al. | 24/293 |

FOREIGN PATENT DOCUMENTS

| | | |
|---|---|---|
| DE | 20 2004 014 219 U1 | 12/2004 |
| DE | 10 2004 017 188 A1 | 11/2005 |
| DE | 20 2005 019 867 U1 | 3/2006 |
| DE | 20 2006 000 846 U1 | 4/2006 |
| EP | 0 696 530 A1 | 2/1996 |
| JP | 7-322278 | 12/1995 |
| JP | 8-35508 | 2/1996 |
| JP | 37-23246 | 7/1996 |
| RU | 1187975 A | 10/1985 |
| RU | 1227836 A1 | 4/1986 |
| WO | WO 02/28690 A1 | 4/2002 |
| WO | WO 2006/026956 A1 | 3/2006 |

OTHER PUBLICATIONS

Office Action Japanese Application No. 2009-554030 dated Nov. 7, 2012.

* cited by examiner

ATTACHMENT ARRANGEMENT AND A TOOL FOR LOCKING AN ATTACHMENT ARRANGEMENT

CROSS-REFERENCE TO RELATED PATENT APPLICATIONS

This application is a Continuation of International Application PCT/EP2008/053355, filed Mar. 20, 2008, which was published in German on Oct. 2, 2008 as WO2008/116817A1. The foregoing International Application is incorporated herein by reference in its entirety.

BACKGROUND

The invention relates to an attachment arrangement with a mounting structure and an attachment element for attaching a part to the mounting structure as well as a tool for locking an attachment element on a mounting structure.

For inflatable airbags of a vehicle occupant restraint system it is in particular known to use attachment elements for attaching the airbag or an airbag module holding the airbag which snap into openings of a mounting structure (for instance a part of a vehicle body). Such attachment elements are for instance described in WO 02/28690 A1.

SUMMARY

The problem to be solved by the present invention is to specify an attachment arrangement with a mounting structure and an attachment element and a tool which enables a save assembly of the attachment element on the mounting structure.

According to an exemplary embodiment of the invention, an attachment arrangement is provided with an attachment element to be inserted into the opening for attaching a part to the mounting structure; and a locking element of the attachment element for locking the attachment element to the mounting structure whereby said locking element is to be inserted as a part of the attachment element along an insertion direction into the opening of the mounting structure up to an end position and engages behind the opening in the end position such that if prevents removal of the attachment element from the opening and thus locks the attachment element to the mounting structure, has at least a first and a second section that rest against the edge of the opening in succession when inserting the attachment element through the opening such that due to the action of the edge of the opening a return force is applied to the attachment element opposite to the insertion direction, and the first and the second section being designed and arranged such that the return force on the attachment element when the second section is inserted through the opening is larger than the first section is inserted through the opening.

Due to the fact that a larger return force is applied to the second section of the locking element an apparent locking of the attachment element in the opening can be prevented since the attachment element pops out at least in part from the opening unless the locking element was not completely inserted into the opening up to an end position and locked in the mounting structure. An incomplete assembly of the attachment element is therefore recognized and can be corrected.

In an exemplary embodiment of the attachment element the first and the second section of the locking element continue angular relatively to the insertion direction. In particular the second section of the locking element is bent stronger (outwards) than the first section, so that the second section in the locked status of the attachment element protrudes further over the edge of the opening than the first section.

The second section for instance—if looked at from the insertion direction—is arranged behind the first section and rests therefore in the locked status of the attachment element closer against a backside of the mounting structure than the first section, whereby the back side of the mounting structure is formed by one side of the mounting structure which faces away from the part to be fixed. The second section of the locking element is therefore inserted into the opening of the mounting structure after the first section.

The attachment element can have for instance a symmetrical axis which continues parallel to the insertion direction. Hereby, the locking element which forms a part of the attachment element can have for instance two arms opposing each other symmetrically or for instance can at least sectionally also be rotationally symmetrical shaped. Further embodiments of the locking element are described in detail below. A symmetrical embodiment of the attachment of the locking element is however not necessarily required. In particular, the geometry of the locking element and further sections of the attachment element can be adopted to a geometry of the opening in the mounting structure for instance to a round, rectangular or also to an opening with a more complicated but not necessarily symmetrical contour. The attachment element can however also be formed such that it can be used for different openings which have different contours; suitable for instance simultaneously for round, oval, rectangular or polygonal openings.

In an exemplary embodiment of the invention the first section is bent in a first acute angle relatively to the insertion direction and the second section is bent in a second acute angle relatively to the insertion direction whereby the second angle is larger than the first angle. The second section is therefore bent stronger outwards (i.e. in the locked status of the attachment element away from the opening of the mounting structure) than the first section. It is to be understood that the first and the second section—if looked at in insertion direction—extends backwards from a head section of the attachment element which is inserted at first during insertion of the attachment element into the opening.

In particular the first section of the locking element is connected with the head section of the attachment element whereby the second section for instance—if looked at from the head section—is arranged behind the first section and is in particular connected with the first section in one piece.

Furthermore, the locking element can be bendable connected with the head section of the attachment element such that by bending the locking element from the head section (out of the rest position) a force arises which counteracts the bending. A component of this force causes the return force on the attachment element when the locking element rests against the edge of the opening.

Due to the spring-like connection with the head section the locking element returns by complete insertion through the opening e.g. by reaching its end position back into its rest position in which the locking element protrudes over the edge of the opening and therefore reaches automatically behind the opening of the mounting structure (e.g. locked on the mounting structure).

In a further exemplary embodiment of the invention the attachment element has for instance two each other opposing, essentially structural identical arms which both engage in the locked status of the attachment element behind the opening of the mounting structure. The arms have in each case a first and a second section whereby the first section of the locking element is formed by the first sections of the arms and the second section of the locking element is formed by the second sections of the arms.

Both arms can for instance have in each case a first and a second section which is bent relatively to the insertion direction whereby the second section is in each case bent stronger and in the locked status of the attachment element protrudes further over the edge of the opening than the respective first section and locks the attachment element on the mounting structure. Furthermore both arms can have a top end over which they are connected with each other so that the top ends connected with each other form a head section of the attachment element which during insertion into the attachment opening is inserted at first into the opening.

The arms are for instance formed as a sheet which with minor width and thickness extends along a main extension line which can also continue in a curved manner. In general, metal or a plastic can for instance be chosen as material for the arms and for the attachment element.

The two arms connected via the head section of the attachment element extend—if looked at from the head section—away from each other, i.e. they have in the area of a section facing away from the head section a larger distance to each other than adjacent to the head section, i.e. the two arms extend from each other in a V-shape. Furthermore, the arms are in particular not distorted against each other, i.e. they extend essentially along a common plane (for instance also symmetrical to each other), whereby the plane continues parallel to the insertion direction.

In a further exemplary embodiment of the invention the attachment element has a stop element which delimits the insertion of the attachment element into the opening of the mounting structure. In particular, the stop element rests at least sectionally against one side of the mounting structure, which faces the fixed part and/or against the fixed part. The stop element can be provided spring-like so that—in the locked status of the attachment element—the stop element is under pre-tension and presses for instance the fixed part against the mounting structure.

Simultaneously, the stop element can be connected with a mounting section of the locking element, whereby the mounting section—in the locked status of the attachment element—rests against the side of the mounting structure facing away from the stop element. Due to the pre-tension of the stop element the mounting section can be drawn to the side of the mounting structure facing away the stop element so that the hold of the attachment element is increased.

In a further exemplary embodiment of the attachment arrangement according to the invention the attachment element has two stop elements which in each case have a first section which extends essentially crosswise to the insertion direction. The stop elements also have in each case at least a second section which is bent relatively to the first section in the insertion direction. In the locked status of the attachment element the two sections are in each case bent from the first section towards the mounting structure whereby the first sections continue for instance essentially parallel to each other and essentially crosswise to the insertion direction. The second sections on the other side can be composed of two or more segments which for instance extend from opposing sides from the first section and are for instance opposite to each other.

In a further exemplary embodiment the first section is in each case bendable connected with a second section of the stop element such that by bending the first section from the second section a force results, i.e. the first is spring-like connected with the second section so that the stop element in the locked status of the attachment element can rest under tension against the mounting structure or the fixed part.

The stop elements can in particular be formed such that—before the insertion of the attachment element into the opening—the second section of one of the stop elements is bent stronger in the insertion direction than the second section of the other stop element. If the attachment element is inserted into the opening of the mounting structure the second section of the one stop element has a smaller distance to the mounting structure than the second section of the other stop element and is pressed against the mounting structure before the second section of the other stop element.

During insertion of the attachment element the sections of the stop elements which are bent to a different degree are thus pressed through in sequence, what makes the assembly of the attachment element easier since the force required for pressing through the stop elements is reduced. In particular, the impression force (assembly force) required for pressing the attachment elements into the opening can thereby be kept at least approximately steady.

In a further exemplary embodiment of the invention the attachment element is formed such that it extends predominantly along a plane which continues crosswise to the insertion direction in order to reduce the space requirement of the attachment element. For this purpose the locking element can for instance continue along a plane which is oriented parallel to the insertion direction whereby the two stop elements are in each case shaped in form of an arm which main direction of extension continues in each case also essentially crosswise to the insertion direction and essentially along this plane. Through this the extension of the attachment element crosswise to the insertion direction is reduced to an area which extends basically along a plane and has a small extension crosswise to the plane.

In a further exemplary variant of the invention the locking element has a bearing section which for instance—as mentioned already above—can be connected with the stop element. In particular, the bearing section rests in the locked status of the attachment element against one side of the mounting structure, which faces away from the fixed part. This can be effected such that the bearing section in the locked status of the attachment element reaches behind the opening of the mounting structure. For example, the bearing section can continue almost parallel to the side of the mounting structure against which it rests.

In a further exemplary embodiment the attachment element has means, which counteract a movement of the bearing section relatively to the mounting structure. In particular, the means counteract a movement of the attachment elements in a direction parallel to the orientation of the bearing section. The means for example are formed as a structure on a side of the bearing section facing the mounting structure, which increase the friction between the bearing section and the mounting structure, for instance in form of a multitude of recesses in the bearing section.

The part to be fixed is in particular an airbag or an airbag module of a vehicle occupant restraint system and the mounting structure is a vehicle part (for instance a part of the vehicle body). The part to be fixed can be for instance a module holder for holding an airbag module. It is pointed out that of course also more than one part can be fixed simultaneously by the attachment element, for instance beside the module holder also a section of the airbag can be fixed by the attachment element.

In a further exemplary embodiment the module holder continues in the area of the attachment element such that it counteracts a distortion of the attachment element. For instance, the unintentional distortion of a mounted attachment element can be prevented, if the module holder continues with a section so close to the attachment element that it blocks the attachment element, e.g. it is arranged such that the attachment element in a certain distortion would strike against the section of the module holder.

The attachment element can have a stop element—as described above—and the module holder can continue in the area of the stop element such that it blocks the stop element, whereby a distortion of the attachment element is counteracted.

The fact that the module holder continues close to the attachment element has besides the anti-twist protection the advantage that the overall height of the assembled airbag module (airbag module plus module holder) is minimized as far as possible.

In a second exemplary aspect of the invention a tool for locking an attachment element on a mounting structure is provided which has an inserting means for inserting the attachment element into an opening of the mounting structure, whereby the inserting means has at least one recess into which a section of the attachment element can move, which is moved during insertion of the attachment element into the opening by the action of the edge of the opening onto the inserting element.

The recess can have in particular an opening in a side surface of the inserting element which continues essentially along the insertion direction so that in particular by a movement vertical to the insertion direction a section of the attachment element can move into the recess. The recess is for instance formed as a through opening which essentially continues crosswise to the insertion direction. It is furthermore possible that the inserting element is implemented as a hollow body, whereby the recess is formed as part of the hollow body which is accessible via an opening in a side wall of the hollow body.

Using the tool it is in particular possible to assemble an attachment element as described above, which for instance has an arm-like locking element, whereby a structure extends from at least one arm of the locking element, which is pressed with the tool towards the inserting element of the tool while inserting the attachment element. In the locked status of the attachment element such a structure can in particular point to the opening in the mounting structure or reach through the same.

An example for such a structure is a bearing section of the attachment element with which the attachment element in the locked status rests against a side facing away from the fixed part, or an unlocking element, which in the locked status of the attachment element reaches through the opening of the mounting structure and is accessible from the outside, i.e. from the side of the mounting structure facing the fixed part, whereby the attachment element can be unlocked by moving (compressing) the unlocking element.

BRIEF DESCRIPTION OF THE DRAWINGS

The invention is explained in the following description of examples on the basis of the Figures.

DETAILED DESCRIPTION

Figure 1B:
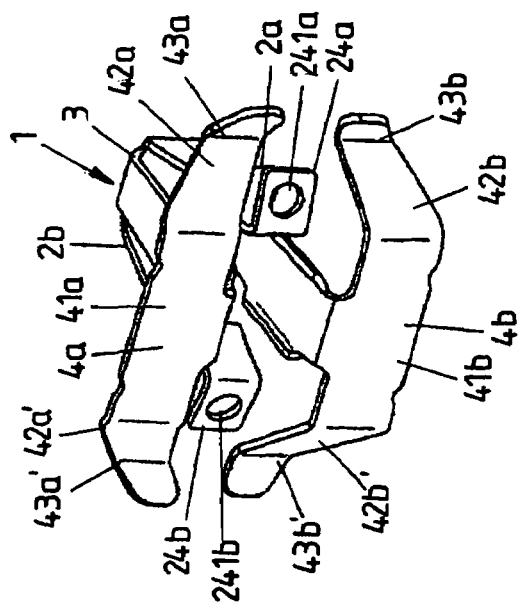
FIG. 1B shows an attachment element according to the invention.
Figure 1A:
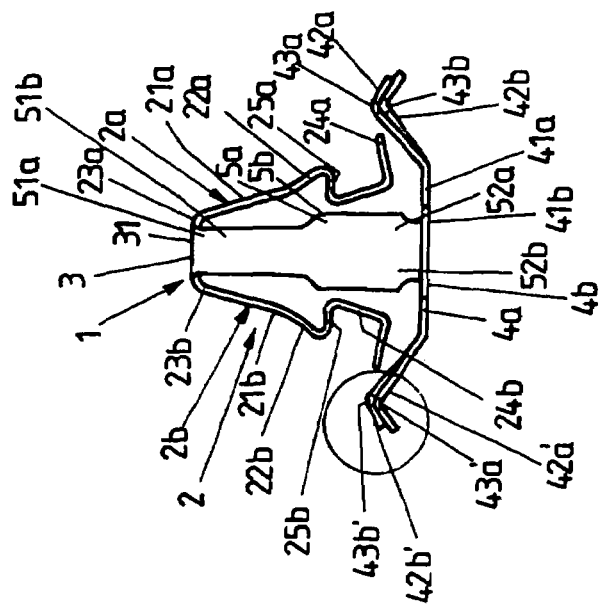
FIG. 1A shows an attachment element according to the invention.

FIGS. 1A and 1B show a variant of the attachment element according to the invention in a side view or in a perspective view. According to FIG. 1A an attachment element 1 has a locking element 2, which serves the locking of the attachment element 1 on a mounting structure (not shown) and which is inserted along an insertion direction into an opening of the mounting structure. The locking element 2 forms two opposing arms 2a, 2b, whereby the arms 2a, 2b are formed symmetrical to each other in relation to a symmetrical axis of the attachment element, which continues parallel to the insertion direction of the attachment element through the centre of the attachment element.

The two arms 2a, 2b have in each case a first section 21a, 21b and a second section 22a, 22b following the first section 21a, 21b in one piece, whereby the first sections 21a, 21b and the second sections 22a, 22b continue in each case outwardly bent to the insertion direction of the attachment element, i.e. the arms 2a, 2b extend away from each other. The respective second sections 22a, 22b are in relation to the insertion direction bent stronger outwards than the first sections 21a, 21b so that they in the locked status of the attachment element protrude further over the edge of the opening in the mounting structure (looked at in the plane of the opening). The first sections 21a, 21b therefore enclose in each case with the second sections 22a, 22b related to the side of sections 21a, 21b and 22a, 22b facing away from the centre of the attachment element an angle w which is smaller than 180°.

The second sections 22a, 22b are—looked at from the insertion direction—arranged behind the first sections 21a, 21b so that the sections 21a, 21b and 22a, 22b while inserting the attachment element rest one after the other, i.e. the second sections 22a, 22b after the first sections 21a, 21b against the edge of the opening. If the locking element is inserted into the opening to its end position the arms 2a, 2b with their first and second sections 21a, 21b and 22a, 22b reach behind the opening and prevent a sliding of the attachment element out of the opening, i.e. the arms 2a, 2b lock at the mounting structure. The second sections 22a, 22b are in the locked status of the attachment element in each case sections of arms 2a, 2b facing the mounting structure.

The arms 2a, 2b are connected with each other at one end 23a or 23b and form in this area a head section 3 of the attachment element 1. The head section 3 has a sub area 31 which is essentially oriented vertical to the insertion direction of the attachment element and from which the arms 2a, 2b in each case bendable stick out. Since the first and second sections 21a, 21b and 22a, 22b of arms 2a, 2b continue in an angle relatively to the insertion direction, they are while inserting the attachment element 1 into the opening pressed to the edge of the opening and are spring-like moved to each other in relation to the sub area 31 of head section 3. Hereby, a spring force occurs, which exerts with a component a return force to the attachment element against the insertion direction. The two arms 2a, 2b are pressed together during insertion into the opening and move again apart when the arms were inserted into the opening to their end position (i.e. the end position of the locking element).

The different degrees of bending relatively to the insertion direction of the first sections 21a, 21b compared to the bending of the second sections 22a, 22b entails that a lower force has to be applied in order to pass the first sections 21a, 21b through the openings (pressing through) as required for passing the second sections 22a, 22b. Accordingly, a lower return force applies to the attachment element by passing the first sections 21a, 21b through the opening compared to passing the second sections 22a, 22b. Therefore, a lower return force applies to the attachment element, if a first section of the locking element which is formed by the first sections 21a, 21b of arms 2a, 2b is passed through the opening compared to passing a second section of the locking element, which is formed by the second sections 22a, 22b of arms 2a, 2b.

For example, the force required for pressing the attachment element into the opening can increase up to 40 till 50 N, if the two sections 22a, 22b of arms 2a, 2b are passed through the opening. Due to the stronger bending of the second sections 22a, 22b an apparent locking of the attachment element is prevented, since an attachment element, which is not completely inserted into the opening but only up to the area of the second section of the locking element, would again pop out from the opening due to the relatively large return force, which is applied to it in this position.

The unlocking elements 24a, 24b for unlocking the attachment element are in each case affiliated to the second sections 22a, 22b whereby the unlocking elements 24a, 24b—if looked at from the head 3 of the attachment element 1—are arranged behind the second section 22a, 22b. The unlocking elements 24a, 24b are compressed for unlocking the arms 2a, 2b—and therefore the attachment element 1—whereby the arms 2a, 2b can also be moved towards each other until they do not any longer reach behind the opening of the mounting structure and the attachment element can be pulled out of the opening. The unlocking elements 24a, 24b have in each case an opening 241a, 241b, which facilitates the compression of the unlocking elements 24a, 24b whereby it is, for instance, possible to reach into the openings 241a, 241b with an adequately formed tool.

Furthermore, the arms 2a, 2b have in each case a bearing section 25a, 25b, which is affiliated to the second section 22a, 22b in an angled manner and continues essentially vertical to the insertion direction of the attachment element 1. The attachment element 1 rests against one side (inner side) of the mounting structure in the locked status (i.e. if the attachment element is mounted to the mounting structure).

Furthermore, the attachment element 1 has two arm-like stop elements 4a, 4b, which limit the insertion of the attachment element 1 and are for instance formed such that an insertion of the attachment element beyond the end position of the arms 2a, 2b is prevented. For this reason stop elements 4a, 4b have in each case first sections 41a, 41b which continue parallel to each other and extend essentially crosswise to the insertion direction. In each case two sections in form of in each case two opposing stop wings 42a, 42a' or 42b, 42b' are affiliated to the first sections 41a, 41b, whereby the wings continue in an angle in insertion direction of the attachment element compared to the sections 41a, 41b.

The respective stop wings 42a, 42a' or 42b, 42b' stick out from the two opposing sides of the first section 41a or 41b. It is pointed out that the wings 42a, 42a' or 42b, 42b' are also in each case directly connected to each other such that the stop element does not have to have a first (continuing crosswise to the insertion direction) section. The stop wings 42a, 42a' or 42b, 42b' have in each case on their ends facing away from the first section 41a, 42b curves 43a, 43a' or 43b, 43b', which can rest against the mounting structure in the locked status.

Each of the two stop elements have a stop wing which is bent stronger in insertion direction from the first section than the second stop wing of the stop element, whereby the stronger bent (curved) stop wing 42a of a stop element 4a faces (looked at in a section vertical to the insertion direction) the stronger bent stop wing 42b' of the other stop element 4b (diagonal). The two stronger bent stop wings of the stop elements are bent approximately in the same manner from the respective middle portion, e.g. they have approximately the same angle in respect to the insertion direction. The attachment curves 43b, 43b' of the stop element 4b and the curves 43a, 43a' of the stop element 4a have therefore—looked at from the insertion direction a distance d to each other; compare the detail enlargement of FIG. 1A. By inserting the attachment element into the opening the curves 43a and 43b or 43b' and 43a are therefore in each case pressed successively against the mounting structure or the part to be fixed so that the two stop elements are pre-stressed successively, what reduces the required forces, e.g. the assembly force of the attachment element. This effect can also for instance be achieved, if one of the stop elements forms two stop wings which are bent stronger in insertion direction compared to the stop wings of the other stop element so that both stop wings off the one stop element stick out from the stop wings of the other stop element in a distance in insertion direction.

The stop elements 4a, 4b are in each case connected to an arm-like formed side bar 5a or 5b, which continues along the insertion direction. The side bars 5a, 5b in turn extend away in each case with its ends 52a, 51b from the head section 3 of the attachment element 1, whereby the stop elements 4a, 4b are affiliated to a side of the side bars 5a, 5b, which is opposite to the head section 3. The side bars 5a, 5b converge with the stop elements 4a, 4b approximately in the centre.

As mentioned, the arms 2a, 2b continue opposite to each other and have a larger distance to each other with increasing distance from the head section 3. They are not twisted to each other, i.e. they extend along a common plane continuing vertical to the insertion direction. In order to keep the space requirement for the attachment element as low as possible the stop elements 4a, 4b are arranged in relation to the arms 2a, 2b such that they also extend with their main extension direction along this plane. The (arm-like form) stop elements 4a, 4b extend thereby mainly in one direction in which the locking elements depart from each other. The attachment element therefore extends all in all—if looked vertical to the insertion direction—essentially only in one direction.

Figure 2A:
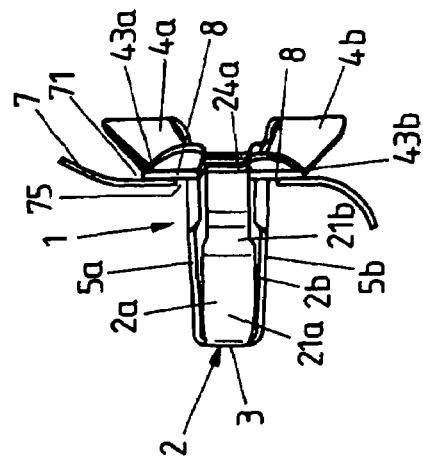
FIG. 2A shows a variant of the attachment arrangement according to the invention.
Figure 2B:
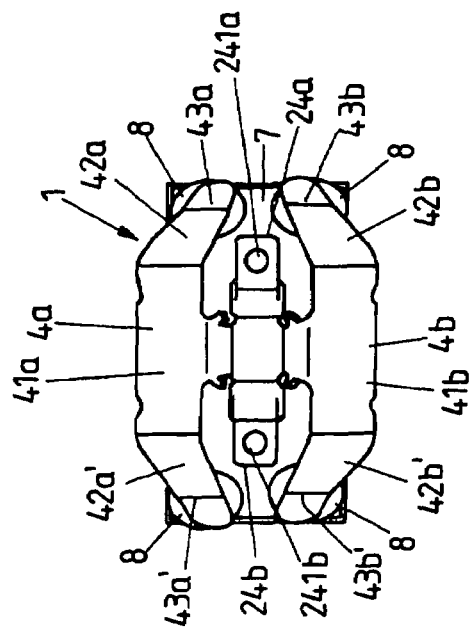
FIG. 2B shows a variant of the attachment arrangement according to the invention.

FIGS. 2A and 2B show the attachment element of FIGS. 1A and 1B as part of an attachment arrangement. FIG. 2A shows the attachment element 1 from below, whereby FIG. 2B shows the attachment element in a side view, whereby one of the arms (2b) of the locking element 2 faces the viewer. As can be in particular seen in FIG. 2B the attachment element 1 reaches with its arms 2a, 2b through an opening 75 of a mounting structure 7 (for instance apart of a vehicle body). The attachment element 1 is pressed so far into the opening 75 so that the stop elements 4a, 4b rest in each case with at least on curve 43*a*, 43*a*' and 43*b*, 43*b*' of the stop wings 42*a*, 42*a*' or 42*b*, 42*b*' against side 71 of the mounting structure 7 facing the stop elements 4*a*, 4*b*.

In the area between the side 71 and the stop elements 4*a*, 4*b* a section of a part (not shown) to be fixed with the attachment element would continue. The curves 43*a*, 43*a*' and 43*b*, 43*b*' rest in each case in a bearing area 8 of the mounting structure 7 against the same, whereby the stop wings 42*a*, 42*a*' or 42*b*, 42*b*' are in each case connected elastically (spring-like) with the middle sections (the first sections) 41*a*, 41*b* of the stop elements 4*a*, 4*b*. Therefore, the stop elements 4*a*, 4*b* can be pre-stressed so that the curves 43*a*, 43*a*' and 43*b*, 43*b*' press in the locked status of the attachment element against the mounting structure 7 (or against the part to be fixed).

While the middle sections 41*a*, 41*b* of the stop elements 4*a*, 4*b* continue approximately parallel to each other a respective stop wing 42*a* or 42*a*' of the stop element 4*a* and a respective adjacent stop wing 42*b* or 42*b*' of the other stop element 4*b* extend in each case towards each other. Therefore, the stop elements 4*a* and 4*b* have in the area of the curves 43*a*, 43*a*', 43*b*, 43*b*' a smaller distance to each other as in the area of the middle sections 41*a*, 41*b* for which reason the bearing areas 8 also have a lower distance to each other than the middle sections 41*a*, 41*b*.

This reduces the space requirement of the attachment element, whereby the attachment element is slimmer in the area of the mounting structure than in the area of the middle sections of the stop elements distanced to the mounting structure. The bearing areas 8 are for instance opposed to each other in a direction in which also the arms 2*a*, 2*b* of the locking element 2 are opposed to each other. In particular, the stop wings can continue to each other such that during assembly of the attachment element to a mounting structure which is formed as a vehicle part and oriented along the vertical vehicle direction the bearing areas are located essentially laterally, i.e. vertical to the vertical vehicle direction, in respect to the opening of the mounting structure and do not protrude over the openings in vertical vehicle direction.

Figure 3B:
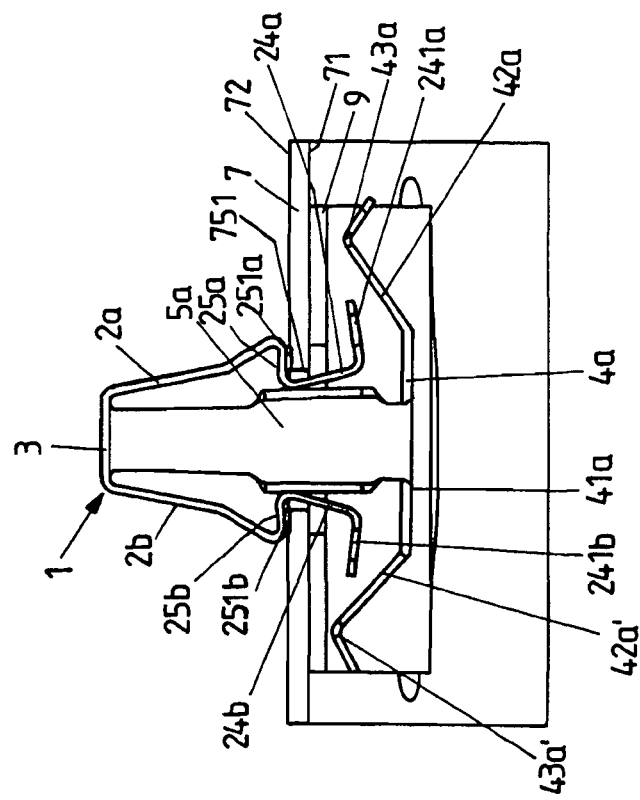
FIG. 3B shows a second variant of the arrangement according to the invention.
Figure 3A:
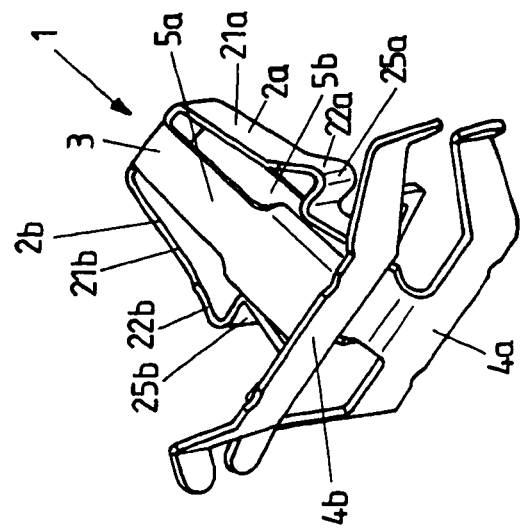
FIG. 3A shows a second variant of the arrangement according to the invention.

The FIGS. 3A and 3B relate to a further variant of the attachment arrangement according to the invention. An attachment element 1 is formed similar to the attachment element of FIG. 1A, 1B or 2A, 2B and has therefore two opposing arms 2*a*, 2*b*, which in each case have a first section 21, 22*b* and a second section 22*a*, 22*b*, which is in relation to the first section bent stronger. A bearing section 25*a*, 25*b* extends from the second section 22*a*, 22*b*, bent in each case, which in the locked status of the attachment element 1—as shown in FIG. 3B—continues approximately parallel to one side 72 of the mounting structure 7, which faces away from a part 9 to be fixed and rests against this side. The bearing sections 25*a*, 25*b* are hereby opposite to each other and extend towards each other.

To the bearing sections 25*a*, 25*b* the unlocking elements 24*a*, 24*b* are affiliated which reach through the opening 75 of the mounting structure 7 so that their operating openings 241*a*, 241*b* are accessible from the outside, i.e. on one side 72 of the mounting structure 7 on which part 9 is fixed to and which faces away from side 71.

Furthermore, a structure 251*a*, 251*b* is arranged on the attachment element 1 which increases the friction between the bearing section 25*a*, 25*b* and the side 71 of the mounting structure 7 facing the bearing section 25*a*, 25*b*. The structure 251*a*, 251*b* can be shaped for instance as a multitude of recesses in the bearing section 25*a*, 25*b* for instance in form of a riffle, so that by moving the attachment element in a direction parallel to side 72 of the mounting structure (i.e. crosswise to the insertion direction of the attachment element) an increased friction applies, through which the attachment element is stabilized in its locking position.

Figure 4A:
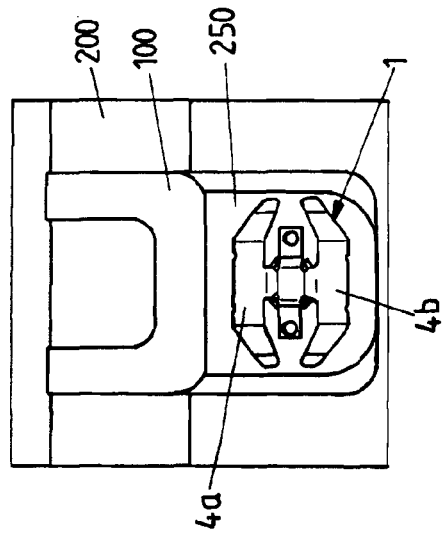
FIG. 4A shows a third variant of the arrangement according to the invention.
Figure 4B:
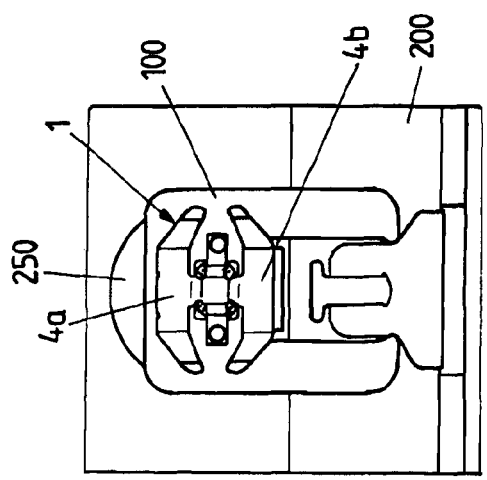
FIG. 4B shows a third variant of the arrangement according to the invention.

FIGS. 4A and 4B show a further variant of the arrangement according to the invention, whereby FIG. 4A is a front view of the arrangement and FIG. 4B a side view of the arrangement. An attachment element 1, which can be formed for instance according to FIGS. 1A, 1B serves for fixing a module holder 100 on a mounting structure 7. The module holder 100 is a receptacle for an airbag module 200, whereby the airbag module 200 comprises an inflatable airbag and a gas generator of a vehicle occupant restraint system. The mounting clip 1 reaches through an opening 102 in a mounting section 101 of the module holder 100 and through an opening 75 in the mounting structure 7 and thereby fixes the module holder 100 on the mounting structure 7. Moreover, a section 250 of the airbag of the airbag module is simultaneously fixed by the attachment element on the mounting structure 7, whereby it extends between the module holder 100 and the mounting structure 7.

The fixing clip 1 has two arm-like stop elements 4*a*, 4*b*, which are aligned parallel to the longitudinal airbag module 200. While the mounting section 101 of the module holder 100 continues in the area of its opening 102, which is being reached through by the fixing clip 100, essentially parallel to a side 71 of the mounting structure 7 facing it, a further section 103 of the module holder extends away from the mounting structure 7 in a bent manner. The section 103 is aligned to the mounting section 101 and continues in the area of one of the stop elements 4*a*, 4*b* such that in case of the attempt to turn the attachment element 1 in the opening 75 the stop element 4*a* would hit on the section 103 of the module holder 100 so that this blocks the stop element 4*a* and counteracts a distortion of the fixing clip 1 in the opening 75.

The distance s of the section 103 to the stop element 4*a* is chosen such that the attachment element 1 can at least not be strongly distorted, i.e. it continues as close as possible to the attachment element. This has the advantage that the mounting height h of the airbag module including the module holder is kept low.

Figure 5A:
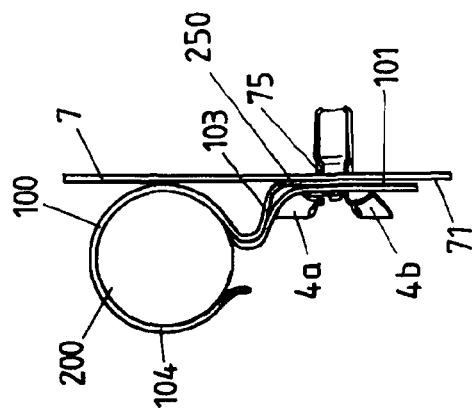
FIG. 5A shows a fourth variant of the arrangement according to the invention.
Figure 5B:
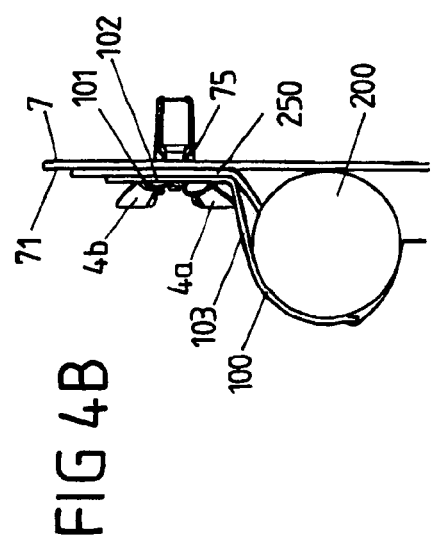
FIG. 5B shows a fourth variant of the arrangement according to the invention.

While FIGS. 4A and 4B relate to an arrangement, in which the attachment element in the arrangement assembled into a vehicle is arranged above (in relation to the vertical vehicle direction) of the airbag module, FIGS. 5A, 5B relate to a further variant of the attachment arrangement according to the invention, in which the attachment element is arranged below the airbag module. Similar to FIGS. 4A, 4B a module holder 100 is fixed by an attachment element 1 on a mounting structure 7 of a vehicle. The module holder 100 serves in turn to house an airbag module 200.

A mounting section 101 of the module holder 103 continues in analogy to the FIGS. 4A and 4B in the area of an opening 75 of the mounting structure 7, which is being reached through by the attachment element 1, almost parallel to the mounting structure 7. A section 103 bends from the mounting section 101 away from the mounting structure 7. The section 103 continues in relation to a stop element 4*a* of the fixing clip such that it blocks the stop element 4*a* and therefore the fixing clip 1 and therefore counteracts a distortion of the fixing clip 1 in the opening 75.

The module holder 100 forms with a receiving section 104 the receptacle for the airbag module 200, whereby the section 104 extends around the airbag module 200 following the form of the airbag module 200.

Figure 6:
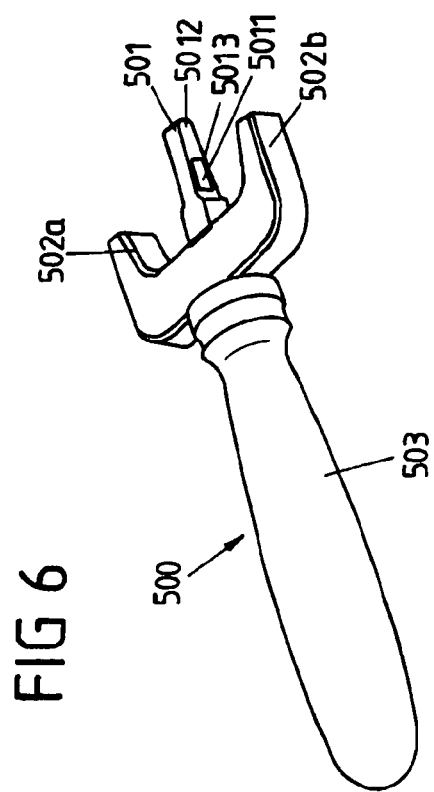
FIG. 6 shows an embodiment of the tool according to the invention.
Figure 7:
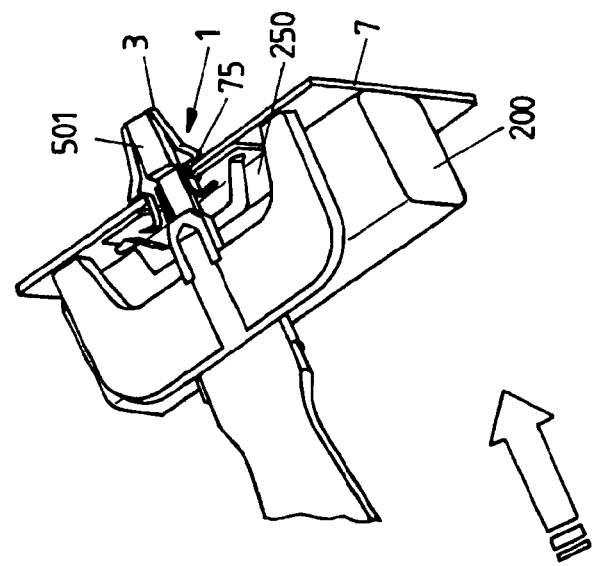
FIG. 7 shows the tool of FIG. 6 during mounting an attachment element.
Figure 7:
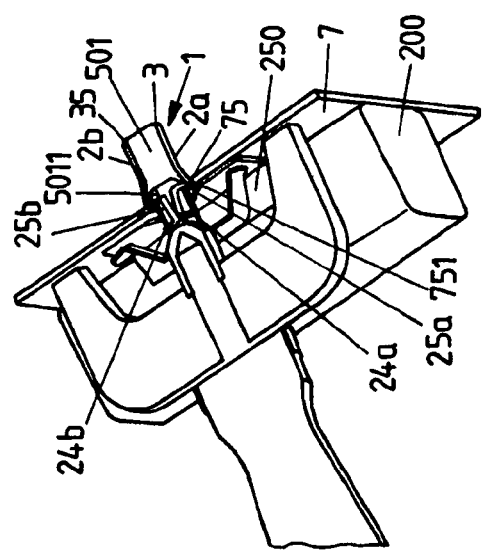

FIGS. 6 and 7 relate to an embodiment of the tool according to the invention for locking an attachment element on a mounting structure. A tool 500 has an inserting element in form of an elongated, middle tooth 501. For inserting the attachment element in an opening the tooth 501 is inserted into the attachment element such that it presses in insertion direction against a section (for instance against a head section) of the attachment element (compare cross view of the tool in FIG. 7) and therefore the attachment element can be moved into the opening until it locks on the mounting structure.

An opening 5011 extends through the middle tooth 501 approximately vertical to the insertion direction and to a side wall 5013 of the middle tooth 501, which is a recess, in which a section of the attachment element can move, which while inserting the attachment element via the tool by the effect of the edge of the opening is bent towards the insertion element. This is shown in FIG. 7. The middle tooth 501 of the tool 500 reaches in insertion direction into the fixing clip 1 so that a front side 5012 of the middle tooth 501 presses against a side 35 of the head section 3 of the attachment element 1 and therefore presses the attachment element 1 in insertion direction into the opening 75 of the mounting structure 7.

In a distance to the middle tooth 501 two opposing stop teeth 502a, 502b are arranged which prevent that the attachment element is inserted too far into an opening by the tool 500. Furthermore, the tool 500 has a hand grip 503 for handling the tool.

While inserting the attachment element 1 arms 2a, 2b of the locking element of the attachment element 1 and further sections of the attachment element 1 connected with the arms 2a, 2b are compressed, i.e. bent approximately vertical to the insertion direction towards each other and therefore in direction of the middle tooth 501. In particular, bearing sections 25a, 25b protruding from the arms 2a, 2b to the inside (i.e. towards each other) or unlocking elements 24a, 24b are bent towards the middle tooth 501 so that they move into the opening 5011 of the middle tooth 501.

Thereby, the arms 2a, 2b can be aligned during passing through the opening 75 approximately parallel to the insertion direction (i.e. parallel to the side walls of the edge of the opening 75) and the attachment element can be inserted into the opening 75 to the end position of the locking element. In case the attachment element is completely passed through the opening 75, the arms 2a, 2b spread apart and lock on the mounting structure 7. This is the case, when the stop teeth 502a, 502b of the tool 500 rest against a side 71 which faces part 9 to be fixed. In case of FIG. 7 the part to be fixed is airbag module 200, which has an airbag from which a section 250 is determined by the attachment element 1 on the mounting structure 7.

Due to the fact that until the complete locking of the arms 2a, 2b on the mounting structure the bearing sections 25a, 25b and the unlocking elements 24a, 24b still reach into the opening 5011 of the middle tooth 501 an attachment element, which is not correctly inserted into the opening, can be again pulled out of the opening by pulling out the tool. Thereby, an incomplete assembly of the attachment element can be recognized and be avoided.

The priority application, German Patent Application 20 2007 004 549.2, filed Mar. 23, 2007, including the specification, drawings, claims and abstract, is incorporated herein by reference in its entirety.

What is claimed is:

1. An attachment arrangement, comprising:
   a mounting structure having an opening;
   an attachment element to be inserted into the opening for attaching a part to the mounting structure; and
   two stop elements that delimit the insertion of the attachment element into the opening in the insertion direction,
   wherein the attachment element comprises a locking element for locking the attachment element to the mounting structure,
   wherein the locking element is configured to be inserted as a part of the attachment element along the insertion direction into the opening in the mounting structure up to an end position and to engage behind the opening in the end position such that the locking element prevents removal of the attachment element from the opening and thus locks the attachment element to the mounting structure,
   wherein the locking element comprises at least a first section and a second section that are configured to rest against an edge of the opening in succession when the attachment element is inserted through the opening such that, due to action of the edge of the opening, a return force is applied to the attachment element opposite to the insertion direction,
   wherein the first and second sections are configured such that, during insertion of the first and second sections of the locking element, a spring force occurs such that one component of the spring force exerts the return force to the attachment element in a direction opposite to the insertion direction,
   wherein the first and second sections are designed and arranged such that the return force on the attachment element when the second section is inserted through the opening is larger than the return force on the attachment element when the first section is inserted through the opening,
   wherein the locking element is configured such that the first and second sections reach behind the opening in the end position of the locking element,
   wherein the first section extends at a first angle from the insertion direction and the second section extends at a second angle from the insertion direction,
   wherein the first angle is different from the second angle,
   wherein the two stop elements each have at least one first section that essentially continues crosswise to the insertion direction, and at least a second section that is bent relative to the first section in the insertion direction, and
   wherein the two stop elements are configured in such a way that, before inserting the attachment element into the opening, the second section of one of the two stop elements is bent inwardly stronger in the insertion direction than the second section of the other of the two stop elements.

2. The attachment arrangement as claimed in claim 1, wherein the second section is bent outwardly stronger than the first section so that, in a locked status of the attachment element, the second section protrudes further over the edge of the opening than the first section.

3. The attachment arrangement as claimed in claim 1, wherein the first section of the locking element is bent in the first angle relative to the insertion direction with a first acute angle, and the second section is bent in the second angle relative to the insertion direction with a second acute angle, and wherein the second acute angle is larger than the first acute angle.

4. The attachment arrangement as claimed in claim 1, wherein the attachment element comprises a head section that is configured to be first of the attachment element to be inserted into the opening, and wherein the locking element is connected with the head section of the attachment element.

5. The attachment arrangement as claimed in claim 4, wherein the locking element is bendably connected with the head section so that, when bending the locking element, a force results from the head section which counteracts the bending.

6. The attachment arrangement as claimed in claim 4, wherein the first section of the locking element is connected with the head section of the attachment element.

7. The attachment arrangement as claimed in claim 4, wherein the second section, if looked at from the head section, is arranged behind the first section.

8. The attachment arrangement as claimed in claim 1, wherein the first and second sections of the locking element are formed from two opposing arms which engage behind the opening of the mounting structure in a locked status of the attachment element.

9. The attachment arrangement as claimed in claim 8, wherein the arms have, in each case, a first section and a second section, and wherein the first section of the locking element is formed by the first sections of arms and the second section of the locking element is formed by the second sections of arms.

10. The attachment arrangement as claimed in claim 1, wherein the locking element has a bearing section configured such that, in a locked status of the attachment element, the bearing section rests at least sectionally against one side of the mounting structure which faces away from the part to be attached to the mounting structure.

11. The attachment arrangement as claimed in claim 10, wherein the bearing section, in the locked status of the attachment element, reaches behind the opening of the mounting structure.

12. The attachment arrangement as claimed in claim 10, wherein the bearing section adjoins to a subarea of the second section of the locking element which faces away from the first section of the locking element.

13. The attachment arrangement as claimed in claim 10, wherein the second section is disposed between the bearing section and the first section of the locking element along the insertion direction.

14. The attachment arrangement as claimed in claim 1, wherein the part which is to be attached to the mounting structure by the attachment element is an airbag or an airbag module for a vehicle occupant restraint system of a vehicle and the mounting structure is a vehicle component of the vehicle.

15. The attachment arrangement as claimed in claim 1, wherein the part which is to be attached to the mounting structure by the attachment element is a module holder for holding an airbag module.

16. The attachment arrangement as claimed in claim 1, wherein the second section of the locking element is directly adjacent to the first section of the locking element.

17. An attachment element to be inserted into an opening of a mounting structure for attaching a part to the mounting structure, comprising:
   a locking element for locking the attachment element to the mounting structure, wherein the locking element is configured to be inserted as a part of the attachment element along an insertion direction into the opening in the mounting structure up to an end position and to engage behind the opening in the end position such that the locking element prevents removal of the attachment element from the opening and thus locks the attachment element to the mounting structure;
   at least a first section and a second section that are configured to rest against an edge of the opening in succession when the attachment element is inserted through the opening such that, due to action of the edge of the opening, a return force is applied to the attachment element opposite to the insertion direction; and
   two stop elements configured to be positioned above the opening adjacent to an outer surface of the mounting structure and that delimit the insertion of the attachment element into the opening in the insertion direction,
   wherein the first and second sections are designed and arranged such that the return force on the attachment element when the second section is inserted through the opening is larger than the return force on the attachment element when the first section is inserted through the opening,
   wherein the locking element is configured such that the first and second sections reach behind the opening in the end position of the locking element,
   wherein the first section extends at a first angle from the insertion direction and the second section extends at a second angle from the insertion direction,
   wherein the first angle is different from the second angle,
   wherein the two stop elements each have at least one first section that essentially continues crosswise to the insertion direction, and at least a second section that is bent relative to the first section in the insertion direction, and
   wherein the two stop elements are configured in such a way that, before inserting the attachment element into the opening, the second section of one of the two stop elements is bent inwardly stronger in the insertion direction than the second section of the other of the two stop elements.

18. An attachment element for insertion into an opening of a mounting structure, comprising:
   a locking element configured to locking the attachment element to the mounting structure, wherein said locking element is configured to be inserted as a part of the attachment element along an insertion direction into the opening in the mounting structure up to an end position and to engage an inner surface of the mounting structure and behind the opening in the end position such that removal of the attachment element from the opening is prevented, thus locking the attachment element to the mounting structure, wherein the locking element has at least first and second sections that are configured to rest against an edge of the opening in succession when inserting the attachment element through the opening such that, due to action of the edge of the opening, a return force is applied to the attachment element opposite to the insertion direction; and
   two stop elements configured to be positioned above the opening adjacent to an outer surface of the mounting structure and that delimit the insertion of the attachment element into the opening in the insertion direction,
   wherein the two stop elements each have at least one first section that essentially continues crosswise to the insertion direction, and at least a second section that is bent relative to the first section in the insertion direction, and
   wherein the two stop elements are configured in such a way that, before inserting the attachment element into the opening, the second section of one of the two stop elements is bent inwardly stronger in the insertion direction than the second section of the other of the two stop elements.

* * * * *